United States Patent
Schouten (12) 
(10) Patent No.: US 9,020,977 B1
(45) Date of Patent: Apr. 28, 2015

(54) MANAGING MULTIPROTOCOL DIRECTORIES

(71) Applicant: EMC Corporation, Hopkinton, MA (US)

(72) Inventor: Michael D. Schouten, Lake Katrine, NY (US)

(73) Assignee: EMC Corporation, Hopkinton, MA (US)

( * ) Notice: Subject to any disclaimer, the term of this patent is extended or adjusted under 35 U.S.C. 154(b) by 287 days.

(21) Appl. No.: 13/731,182

(22) Filed: Dec. 31, 2012

(51) Int. Cl.
*G06F 17/30* (2006.01)
*G06F 7/00* (2006.01)
*H04L 29/08* (2006.01)

(52) U.S. Cl.
CPC .... G06F 17/30097 (2013.01); H04L 29/08081 (2013.01)

(58) Field of Classification Search
CPC ............ G06F 17/30123; G06F 17/302; G06F 17/30097; H04L 29/12169; H04L 61/1576; H04L 67/1097
USPC ........................................................ 707/796
See application file for complete search history.

(56) References Cited

U.S. PATENT DOCUMENTS

| | | | |
|---|---|---|---|
| 5,893,086 A * | 4/1999 | Schmuck et al. ..................... 1/1 |
| 7,181,439 B1 * | 2/2007 | Lent et al. .............................. 1/1 |
| 7,548,959 B2 * | 6/2009 | Nakatani et al. ............... 709/217 |
| 7,590,652 B2 * | 9/2009 | Passey et al. .......................... 1/1 |
| 7,610,329 B2 * | 10/2009 | Bone et al. ..................... 709/201 |
| 7,698,325 B1 * | 4/2010 | Ozekinci et al. .............. 707/698 |
| 7,873,700 B2 * | 1/2011 | Pawlowski et al. ........... 709/213 |
| 8,255,550 B1 * | 8/2012 | Becher et al. ................. 709/230 |
| 8,549,582 B1 * | 10/2013 | Andrews et al. ................... 726/3 |
| 2007/0038697 A1 | 2/2007 | Zimran et al. |
| 2007/0088702 A1 * | 4/2007 | Fridella et al. .................. 707/10 |
| 2010/0257218 A1 * | 10/2010 | Vassilev et al. ............... 707/823 |

OTHER PUBLICATIONS

Sabharwal, Ashish, "CSE 326: Data Structures, Topic #10: Data Hashing (3)," MS Powerpoint presentation, Autumn 2003, 2 slides.
Elmasri, et al., "Fundamentals of Database Systems," 5th edition, MS Powerpoint presentation, 2007, 38 slides.

* cited by examiner

*Primary Examiner* — Jeffrey A Burke (74) *Attorney, Agent, or Firm* — BainwoodHuang (57) ABSTRACT

An improved technique for managing directory objects accessible via multiple protocols includes storing directory entry components in leaves of an extendible hash tree. Each directory entry component includes an indication of each protocol to which the name conforms, thereby allowing the same directory entry component to be used for representing directory object names in multiple protocols. Efficiency is improved, especially for large directory structures, by keeping related information about directory objects together, in the same directory entry components and/or in the same leaves of the extendible hash tree.

20 Claims, 5 Drawing Sheets

MANAGING MULTIPROTOCOL DIRECTORIES

BACKGROUND

Computer systems conventionally employ data structures for managing information about directory objects, such as files and sub-directories. In one arrangement, a different data structure is provided for each directory of a computer's file system. The file system manages the data structures and stores information about objects in different directories. Information about each directory object is provided in a respective "directory entry." Each directory entry includes the name of a directory object (e.g., its file name) and an "inode" number, which uniquely identifies the object in the file system.

In one prior arrangement, names of directory objects are hashed, and the hash values form indices for accessing hints to directory entries on disk. The hints are kept in volatile memory (e.g., RAM) within "hash buckets," i.e., structures for storing information over respective ranges of hash values. Depending on implementation, a large number of hash buckets may be provided, each covering a unique range of hash values for storing various hints. Given a directory object name, the file system can look up the hint for that name by hashing the name and jumping to the hash bucket whose range includes the computed hash value. The file system can then find the hint in the hash bucket and scan the disk location designated by the hint for the directory entry on disk.

In some arrangements, multiple client devices can connect to a computing system to access its directory objects, e.g., over a network. In some cases, the client devices operate with different network protocols that impose different file naming conventions. For example, some client devices use the NFS protocol, which employs a Unix file naming convention, whereas others use Microsoft Windows CIFS, which employs long file names (i.e., up to 256 characters, or "M256"). Also, some client devices use Microsoft DOS short file names (i.e., up to eight characters, followed by a single "." and a 3-character extension, or "M83"). Given these different naming conventions, any given directory object can have up to three different names, one for each protocol. Prior implementations support multiple protocols for a directory object by providing a different hint for each protocol, where all such hints point to the same directory entry on disk.

SUMMARY

It has been observed that directories of computing systems can become quite large, in some cases containing in excess of 1 million directory objects. With the prior approach, as directories grow, so too do the hash buckets used to store their hints, with hash buckets for very large directories consuming considerable volatile memory. In some cases, hash buckets in the aggregate for all directories of systems can consume so much memory that the performance of applications running on such systems can become impaired. Also, the hash buckets may individually become quite large, storing thousands of hints, such that scanning and updating such large hash buckets can consume substantial resources.

Further, the prior approach stores hints for directory entries in all protocols, regardless of whether the protocols use the same name or different names. Thus, using the prior approach, the aggregate size of all hash buckets of a directory grows in volatile memory in proportion to the number of protocols supported.

In contrast with the prior approach, an improved technique for managing directory objects accessible via multiple protocols includes storing directory entry components in leaves of an extendible hash tree. The leaves of the extendible hash tree are limited in size and each cover a respective range of hash values. As a directory grows, the number of leaves is increased. Each directory entry component includes the name of a directory object, its inode number, and an indication of each protocol to which the name conforms. Thus, for example, if the name of a directory object conforms to Unix, M256, and M83, the directory entry component for that object indicates this condition, such that only a single directory entry component is stored for representing the directory object in all three protocols. In such cases, directory access can be achieved for all protocols using only a single hash. The improved technique avoids the need for providing hints within volatile memory, as mapping of hash values to locations of leaves that store directory entry components can be direct. In some examples, the leaves are stored on disk or other non-volatile media, thus liberating volatile memory for use by applications. Also, because the leaves of the extendible hash tree have limited size, volatile memory requirements remain modest when caching leaves, as each leaf is relatively small compared with the worst case for hash buckets used with the prior approach, which can grow without limit as directories grow.

In some examples, directory object names are received in a first protocol but the received name cannot be used for a second protocol because the name is already in use in the second protocol. Here, in some examples, the file system creates a new, unique name for the second protocol based on the name in the first protocol, in such a way that the new name hashes to the same value as the name in the first protocol. This arrangement ensures that the directory entry component for the first protocol and the second protocol are stored in the same leaf of the extendible hash tree, further promoting efficiency.

Certain embodiments are directed to a method conducted by a set of processors for managing directory objects accessible over a network using multiple protocols. The method includes receiving, over the network, a request to store in memory a directory object having an inode number and a name, the name conforming to a first protocol. The method further includes executing a hash function on an input based on the received name, to generate a hash value. The method further includes generating a directory entry component that includes the received name, the inode number, the computed hash value, and an indication of each of multiple protocols with which the directory object is accessible using the received name. The method still further includes storing the generated directory entry component in a leaf of an extendible hash tree, the extendible hash tree including multiple leaves, each of the leaves storing directory entry components over a predetermined range of hash values.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing directory objects accessible via multiple protocols includes storing directory entry components in leaves of an extendible hash tree. Each directory entry component includes an indication of each protocol to which the name conforms, thereby allowing the same directory entry component to be used for representing directory object names in multiple protocols.

Figure 1:
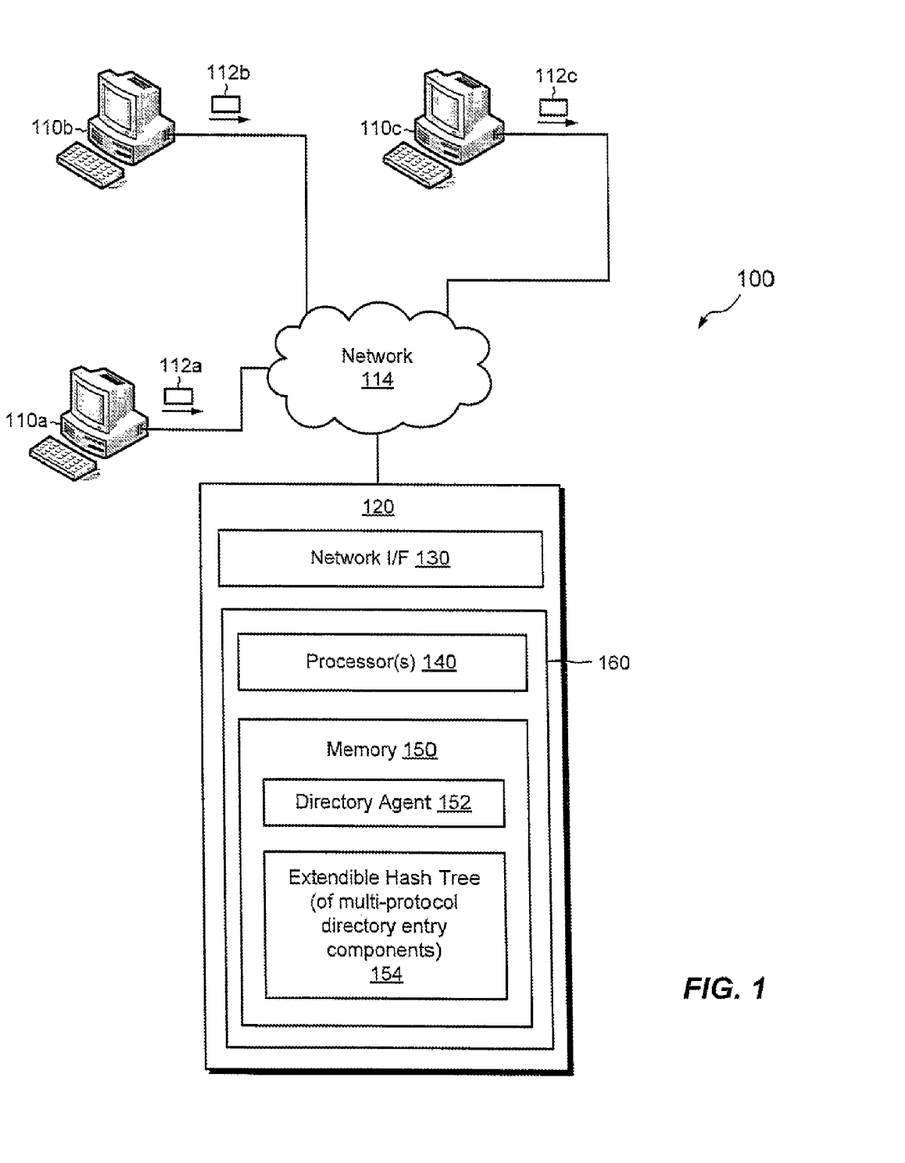
FIG. 1 is block diagram showing an example environment suitable for implementing an improved technique for managing multiprotocol directory names.

FIG. 1 shows an example environment 100 in which embodiments of the improved technique hereof can be practiced. Multiple client devices, shown here as computers 110a, 110b, and 110c, each access a computerized apparatus 120 over a network 114. The computerized apparatus 120 includes a network interface 130, a set of processors 140 (i.e., one or more processing chips and/or assemblies), and memory 150. The memory 150 includes both volatile memory (e.g., RAM) and non-volatile memory, such as one or more disk drives, solid state drives (SSDs), and the like. The set of processors 140 and the memory 150 together form a specialized circuit 160, which is constructed and arranged to carry out various processes and functions, as described herein.

The memory 150 includes a directory agent 152 and an extendible hash tree 154. In an example, the directory agent 152 is part of a file system of the computerized apparatus 120. The extendible hash tree 154 includes leaves that store directory entry components for multiple network protocols. Preferably, the extendible hash tree 154 is stored on disk or other non-volatile memory of the computerized apparatus 120, and leaves of the extendible hash tree 154 can be read into volatile memory (cached) to allow the directory agent 152 to perform directory operations. In an example, many extendible hash trees 154 are provided, e.g., one for each directory of the file system, although only one is shown for simplicity.

The client devices 110a, 110b, and 110c are shown as computers; however, it is understood that the client devices 110a, 110b, and 110c may be any type of computing devices, such as desktop computers, laptop computers, smart phones, personal data assistants (PDAs), tablet computers, set top boxes, or any type of computing device capable of connecting over a network. The client devices 110a, 110b, and 110c need not be of the same type, and any number of client devices may be provided. The network 114 can be any type of network, such as the Internet, a local area network (LAN), a wide area network (WAN), a cell phone network, a wireless data network, or any combination of these, for example. Similarly, the computerized apparatus 120 can be any type of computing device or system capable of connecting to a network. In one particular example, the computerized apparatus 120 is a network attached storage system (NAS), which includes, as part of the memory 120, a storage array, such as a VNX® array available from EMC Corporation of Hopkinton, Mass.

In operation, the client devices 110a, 110b, and 110c issue respective requests 112a, 112b, and 112c to the computerized apparatus 120 to perform actions related to directory objects. For example, the requests 112a, 112b, and 112c direct the computerized apparatus 120 to create, delete, look up, and/or list files and/or sub-directories of a directory. In an example, the client devices 110a, 110b, and 110c access directory objects of the computerized apparatus 120 using different network protocols. Different file naming conventions apply to these different network protocols. In a particular example, the request 112a from the client device 110a includes a directory object name in a Unix protocol, the request 112b from the client device 110b includes a directory object name in an M256 protocol, and the request 112c from the client device 110c includes a directory object name in an M83 protocol. The directory object names in the requests 112a, 112b, and 112c may refer to different directory objects on the computerized apparatus 120, or they may refer to the same directory object.

In a typical scenario, the directory agent 152 of the computerized apparatus 120 receives a request (e.g., 112a) from one of the client devices (e.g., 110a) to store a directory object (e.g., a file) according to a particular protocol. The request 112a includes the name of the directory object and an inode number, which specifically identifies the directory object in a file system of the computerized apparatus 120. The directory agent 152 executes a hash function based on the received name to generate a hash value. Preferably, the hash function is an integer hash function that produces a different integer value for each different input, but always produces the same integer value for the same input. The hash value identifies a particular leaf in the extendible hash tree. Typically, the directory agent 152 then generates a directory entry component for the directory object and stores the generated directory entry component in the identified leaf of the extendible hash tree 154. The generated directory entry component includes, inter alia, the received name of the directory object, the inode number, and an indication of each of the protocols with which the directory object is accessible using the indicated name. For example, if the request 112a is a Unix request, the generated directory entry component will indicate that the directory object is accessible with the name received in the request 112a in Unix. If the name is also a valid M256 name, the directory entry component will indicate that the directory object is accessible with the name in M256. Further, if the name is a valid M83 name, the generated directory entry component will indicate that the directory object is accessible with the name in M83. In some examples, indications of the protocols with which the name is accessible are provided in a set of flags, where each flag is associated with a particular protocol, and setting a flag indicates that the name is valid in the respective protocol.

With a directory entry component storing indications of each protocol to which the component applies, information about the referenced directory object is typically accessed through a single directory entry component in a single leaf of the extendible hash tree 154. The technique for managing directory objects is thus more efficient than prior implementations that require a different hint to be stored for each protocol.

In some situations, the name received with a request (e.g., 112a) cannot be used for all protocols because the received name is already being used in the directory for a second (or third, etc.) protocol. Names can be used only once in a directory for any given protocol, i.e., no two files or sub-directories can have the same name in the same protocol. In some examples, when a name is already used in a second protocol, the directory agent 152 creates a new name for use in the second protocol. A new directory entry component is generated and stored for the new name. The new directory entry component is typically stored in the same leaf of the extendible hash tree 154 as the directory entry component for the received name, thus preserving efficiency of access.

For example, the new name is generated based on the received name, such that the new name produces the same hash value (and is thus stored in the same leaf) as the original name. The new name is created to have a core portion, which is the same as the original name, and a suffix portion, which is unique. Thus, if the received name in the first protocol is "FOO," the directory agent 152 can create a new name, e.g., "FOO~1" for the second protocol. The hash function can be configured to use only the core portion of any name (e.g., the "FOO" of "FOO~1") and to ignore the suffix portion (e.g., "~1"). In this manner, directory entry components for both "FOO" and "FOO~1" hash to the same value and are stored in the same leaf. Thus, even when a new name must be created in a second (or other) protocol to maintain uniqueness, directory entry components for the same directory object are kept together in the same leaf of the extendible hash tree 154. Keeping related components together in this manner promotes efficiency, as directory operations (such as list and delete) requiring access to multiple directory entry components can access information about names for all protocols from a single leaf, generally with a single disk read operation.

Where multiple directory entry components are created based on the same core, a disambiguating indicator is provided for distinguishing among them. The disambiguating indicator is different for each such directory entry component, and is used in conjunction with the hash value for uniquely addressing each respective directory entry component.

In some cases, the received name provided in a request (e.g., 112a) cannot be used in one or more other protocols. For example, the "*" character is legal in Unix file names but not in M256 or M83. In these cases, the directory agent 152 creates a new name for the second (or other) protocol, which replaces the illegal character with one that is allowed in the second (or other) protocol. For example, the directory agent 152 creates the name "SONG_79" for M256 (or M83) when the Unix name "SONG*79" is received. As "SONG_79" is different from "SONG*79," it hashes to a different value. A new directory entry component is created for "SONG_79," which may be used for both M256 and M83, which will typically be stored in a different leaf of the extendible hash tree 154 from the leaf where "SONG*79" is stored.

In cases such as this, as well as in the case above involving FOO and FOO~1, a sibling reference is added to both the original directory entry component and the new directory entry component in a circular manner, e.g., using a circularly linked list. For example, where two directory entry components are created for a single directory object, each directory entry component includes a sibling reference that points to the other. Where greater than two directory entry components are created (for greater than two different names), each directory entry component includes a sibling reference to another, with the last sibling reference pointing back to the first. In some examples, sibling references provide the hash codes associated with the sibling directory entry component, as well as the disambiguating indicator (if one is provided). In other examples, sibling references include cookies that specify locations (e.g., block offset values) where sibling directory entry components can be found.

In some examples, hash values are computed based on modified versions of names. For example, received names are converted to Unicode prior to hashing. In addition, names arriving in a case-sensitive protocol (such as Unix) are sometimes converted to case-insensitive names (e.g., by hashing upper-case versions of the names). In one particular example, names arriving in Unix format are hashed case-insensitively (i.e., converted to all upper-case) if the Unix names are also valid in M256, but are hashed case-sensitively otherwise. Hashing names case-insensitively has the benefit of ensuring that both the case-sensitive (e.g., Unix) name and case-insensitive (e.g., M256) name hash to the same value and can thus be stored in the same directory entry component, promoting efficiency. However, if the names are bound to be different anyway (e.g., because illegal characters have to be replaced in one of the names), there is no benefit to rendering the case-sensitive name case-insensitively. Doing so can actually be detrimental, as it renders the case-sensitive name less unique than it would otherwise be.

In some situations, names are received that are identical to names already stored for the same protocols, except for a difference in case. For example, a Unix filename "gLoria" may be received when a file named "Gloria" has already been received and stored in a directory entry component of the extendible hash tree 154. As both the names "gLoria" and "Gloria" are valid M256 names, both are hashed case-insensitively to generate the same hash value, producing a hash collision. In these circumstances, a directory entry component is created for the new name, and unique addressability is achieved through the use of the disambiguating indicator. Thus, the directory entry components for "gLoria" and "Gloria" will have the same hash value but different disambiguating indicators, thereby maintaining unique addressability.

Figure 2:
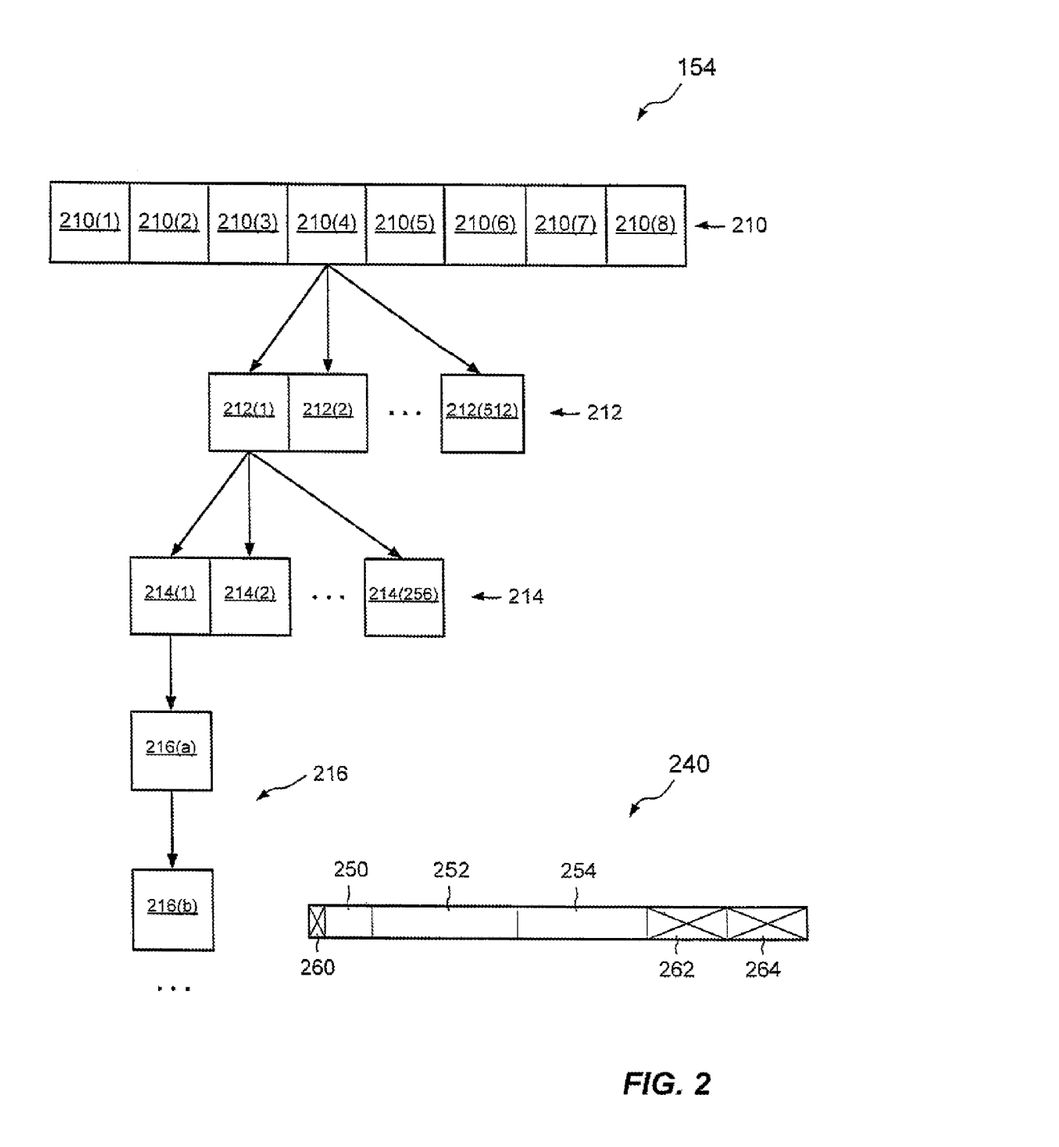
FIG. 2 is a diagram showing an example extendible hash tree of FIG. 1 in additional detail.

FIG. 2 shows an example implementation of the extendible hash tree 154. This implementation is used in connection with integer hash values that are 26 bits long. In an example, a 32-bit integer hash value 240 is computed based on each name, but only 20 bits (spanning regions 250, 252, and 254) are used for addressing leaves. In the example shown, each hash value 240 includes a first bit region 250 (e.g., three bits), a second bit region 252 (e.g., nine bits), and a third region 254 (e.g., eight bits), for addressing respective levels of the distributed hash tree 154.

As shown, the extendible hash tree 154 has a first level 210, which includes leaves 210(1) through 210(8). In this example, the extendible hash tree 154 for each directory starts with these eight leaves, and each leaf is initially designated for storing directory entry components. Each leaf 210(1) through 210(8) has a particular size, such as 1 KB. It is understood that other implementations may have first levels including a greater or fewer number of leaves, which may be of different sizes than those shown, or may be of variable size less than some maximum limit.

Beginning with these eight leaves 210(1) through 210(8), the extendible hash tree 154 is extended as needed to accommodate directory entry components to be stored. When a new request (e.g., 112a, 112b, or 112c) is received, a hash value 240 is generated based on the received name. A three-bit region 250 of the hash value 240 is used to address one of the leaves 210(1) through 210(8). A directory entry component is created for the received name and stored in the leaf designated by these three bits. As new directory entry components are created, the first level 210 fills in this manner until insufficient space is available in an addressed leaf to store a new directory entry component.

When any leaf in the first level 210 becomes full, two new leaves are created in a second level 212 of the extendible hash tree 154. For example, when leaf 210(4) becomes full, two new leaves 212(1) and 212(2) are created. Distinguishing between leaves 212(1) and 212(2) requires only one additional bit of the hash value 240. In general, leaves at the second level 212 are addressed using the nine bits from region 252 of the hash value 240. However, not all nine bits are needed, initially. In this implementation, all leaves at the second level 212 are 1 KB in size.

Upon creation of the leaves 212(1) and 212(2), leaf 210(4) is converted into an index block, and the directory entry components of the leaf 210(4) are distributed between the leaves 212(1) and 212(2) based on their hash values. For example, the fourth bit of the hash value of each directory entry component in the leaf 210(4) is read. Directory entry components for which the fourth bits of their hash values is zero are stored in leaf 212(1), whereas directory entry components for which the fourth bit of their hash values is one are stored in leaf 212(2). The index stored in block 210(4) is updated to associate each of the two ranges of hash values with a pointer to one of the leaves 212(1) and 212(2).

As leaves at the second level 212 fill, they initially split laterally to create new leaves at the second level 212. For example, leaf 212(2) can split to create a third leaf 212(3) (not shown) at the second level 212. The contents of leaf 212(2) are then distributed, using another bit of the hash value 240, between the leaves 212(2) and 212(3). The index in leaf 210(4) is then updated to reflect the new mapping of hash codes to leaves. Using all nine bits of the region 252 of the hash code 240, up to 512 leaves may be created at the second level 212 for each leaf at the first level 210.

Once all 512 leaves have been created at the second level 212 for a given leaf at the first level 210, leaves at the second level 212 can no longer split, as the available addresses in the second region 252 have been exhausted. The extendible hash tree 154 can continue to grow, however, by creating a third level 214 of leaves addressable via the third region 254 of the hash value 240. In this example, leaves at the third level 214 are also 1 KB in size. When a leaf at the second level 212, e.g., leaf 212(1), can no longer split, two new leaves 214(1) and 214(2) are created at the third level 254, and the directory entry components of leaf 212(1) are distributed, based on an additional bit of the hash value 240, between the leaves 214(1) and 214(2). Leaf 212(1) is converted to an index block, which maps hash values to the leaves 214(1) and 214(2).

When leaves at the third level 214 fill, they split laterally, initially, as did the leaves at the second level 212. In this example, up to 256 leaves can be created at the third level 214, for each leaf at the second level 212, before the address space of the region 254 is exhausted.

Once all bits of the region 254 are used, no more splits can be made at the third level 214. However, the extendible hash tree 154 can continue to grow through the use of extended leaves 216. For example, when leaf 214(1) fills and can no longer split, a new leaf 216(a) is provided as an extension of leaf 214(1). A pointer is added to leaf 214(1) to identify the location of leaf 216(a). Additional leaves (e.g., 216(b), etc.) can be added if additional space is required, with a pointer added each time to identify the location of the next extended leaf. In this fashion, the extendible hash tree 154 can grow indefinitely, to accommodate arbitrarily large directories. In this example, the extended leaves 216 are each 1 KB in size.

As shown, the hash value 240 also includes regions 260, 262, and 264. These are typically not used for addressing leaves of the hash tree 154, but may be used for other purposes. As will be described further below, region 260 stores bits used for referencing sibling components in extended leaves. Region 262 (e.g., six bits) may be applied to address particular directory entry components within a leaf and thus helps to avoid hash collisions. Region 264 stores a disambiguating indicator (e.g., 328 of FIG. 3)

Figure 3:
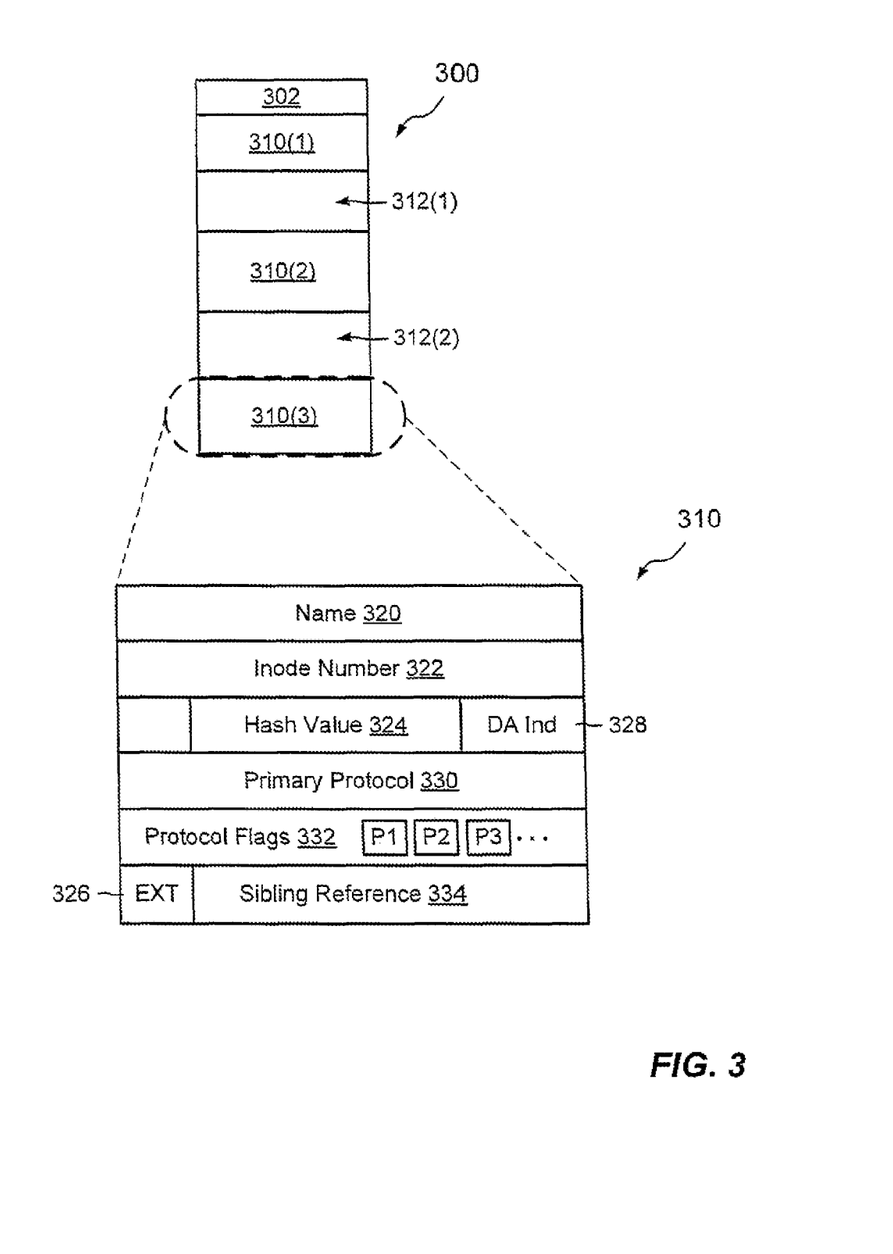
FIG. 3 is a diagram showing an example leaf of the extendible hash tree of FIG. 2 in additional detail.

FIG. 3 shows an example leaf 300 in additional detail. The leaf 300 is representative of any of the leaves shown in FIG. 2 that store directory entry components. The leaf 300 is seen to include a header 302, directory entry components 310(1) to 310(3), and available spaces 312(1) to 312(2). It is understood that the leaf 300 may include a greater or lesser number of directory entry components and available spaces.

In some examples, the header 302 is used to point to extended leaves. For example, leaf 214(1) includes a pointer in its header 302 that points to leaf 216(a). In addition, extended leaves may include pointers in their headers 302 to point to next extended leaves, e.g., the leaf 216(a) may include a pointer in its header 302 to the leaf 216(b). The header 302 may also include an indication of whether the leaf 300 is itself an extended leaf.

Available spaces 312(1) to 312(2) are locations that are available for storing new directory entry components. These spaces may appear at the end of a leaf, or at locations where previously stored directory entry components have been deleted, making space available for new directory entry components.

The structure of a generalized directory entry component 310 is shown at the bottom of FIG. 3. Here, it is seen that the directory entry component 310 includes several portions:

A name 320. In some directory entry components, the name 320 is the received name, i.e., the name received in a request 112a, 112b, or 112c. In other directory entry components, the name 320 is one that is generated by the directory agent 152, such as when a duplicate name is found in a second or other protocol, or when the received name is not legal in a second or other protocol, such that a new name for that protocol must be created.

An inode number 322. The inode number 322 specifically identifies the directory object (e.g., a file or sub-directory) in the file system. Although different directory entry components may be generated for a single directory object, there is only one inode number for each directory object.

A hash value 324. When the directory entry component 310 is located in the addressable space of the extendible hash tree 154 (i.e., not in an extended leaf), the hash value 324 is based on the name 320. In the illustrated implementation, only 26 bits of a 32-bit integer hash code are stored. Preferably, the name 320 is first converted to Unicode before computing the hash value 324. In some examples, the Unicode-converted name is rendered case-insensitively prior to hashing (e.g., when the name 320 is received in Unix format and the name 320 is also a valid M256 name). In other examples, the name is hashed case-sensitively (e.g., when received in Unix format when the name 320 is not a valid M256 name).

A disambiguating (DA) indicator 328. The DA identifier 328 is used when the EXT bit 326 is false and different names hash to the same hash value 324. In the illustrated implementation, the DA indicator 328 is a 5-bit value that allows up to 32 names in any leaf to produce the same hash value. Directory entry components for additional names that produce the same hash value (if there are any) are stored in extended blocks (e.g., 216). The DA indicator 328 is set to all zeros when the hash value 324 is used in the extendible hash tree 154 only once. Otherwise, the DA indicator 328 is set to a non-zero value and is used in conjunction with the hash value 324 to uniquely identify the directory entry component in the extendible hash tree 154.

A primary protocol 330. For a directory object name 320 received in a request (e.g., one of the requests 112a, 112b, or 112c), the primary protocol 330 identifies the protocol used for the request. For a name that is created for a protocol other than the one in which the object is received (e.g., because a duplicate name is found in another protocol or because the name is not legal in the other protocol), the primary protocol 330 identifies the protocol for which the new name has been created. In an example, the primary protocol 330 is implemented as a flag, "UNIX_PRIMARY," which is set to true if the name 320 was received in or created for Unix protocol, and which is set to false if the name was received in or created for M256 or M83. In this particular implementation, the primary protocol 330 can never be M83. If an M83 (DOS) name is received or created, M256 is identified as the primary protocol 330. Even though M256 and M83 are different protocols, the Windows operating system considers them to be in the same namespace. Thus, one cannot create an M256 name "X" if the name "X" already exists in M83 space, and M256 and M83 are considered here a single protocol for purposes of identifying duplicate names.

A set of protocol flags 332. The protocol flags 332 indicate each of the multiple protocols with which the directory object can be accessed using the name 320. A different flag (e.g., P1, P2, P3 . . . ) is provided for each supported protocol. The respective flag is set if the directory object is accessible using the name 320; otherwise, it is cleared. In an example, the flag P1 represents Unix, the flag P2 represents M256, and the flag P3 represents M83. If all three flags are set, then the directory entry component is used to access the underlying directory object via all three protocols. If fewer than all flags are set, then one or more other directory entry components are provided, e.g., in the same leaf or elsewhere, to access the underlying directory object via the protocols corresponding to the flags that are cleared.

A sibling reference 334. The sibling reference 334 points to one other directory entry component used to access the same directory object via another protocol. The sibling reference 334 is used only when a sibling component exists, i.e., when two or more directory entry components are needed to access the same directory object via different protocols. Otherwise, the sibling reference 334 is set to zero. The contents of the sibling reference 334 vary based on context. If the sibling component is stored in an addressable part of the extendible hash tree (i.e., not in an extended leaf), then the sibling reference 334 includes the hash value 324 and the DA indicator 328. The sibling reference 334 may also include the EXT bit 326; however it will always be set to false in this scenario. If, however, the sibling component is stored in an extended leaf, the EXT bit 326 of the sibling reference 334 is set to true and a cookie designating an offset value providing a fixed location of the sibling component.

An extension bit (EXT) 326. The EXT bit 326 is set to true when the sibling reference is addressed not by a hash value, but instead by a cookie specifying an offset value relative to a fixed disk location where the sibling can be found. Otherwise, it is set to false. The EXT bit 326 thus indicates whether the designated sibling is stored in an extended leaf (e.g., 216) or in a directly addressable leaf. Unlike directory entry objects in leaves that can be split and therefore can move on disk, directory entry objects addressed by offset values have fixed locations on disk.

Figure 4:
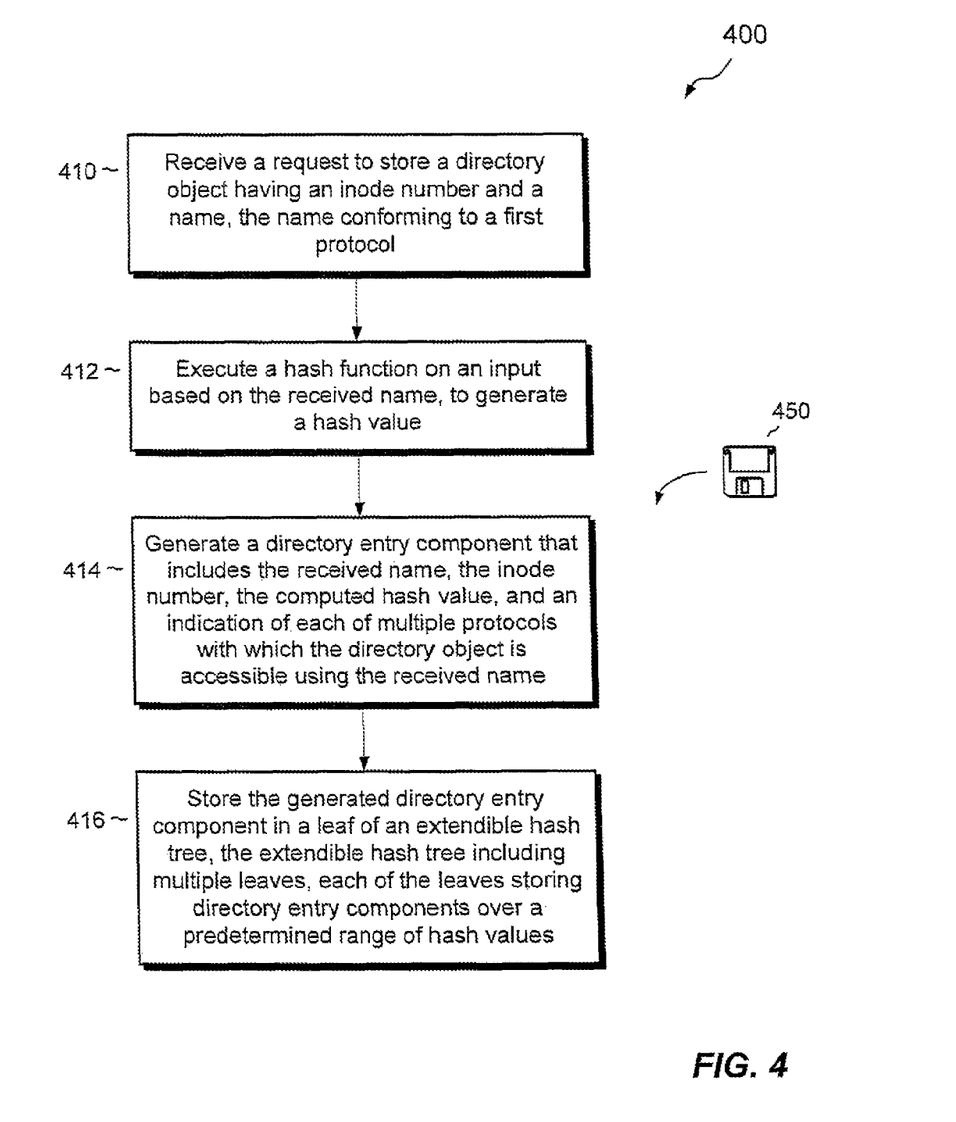
FIG. 4 is a flowchart showing an example process for responding to a request to store a directory object using the extendible hash tree of FIG. 2.
Figure 5:
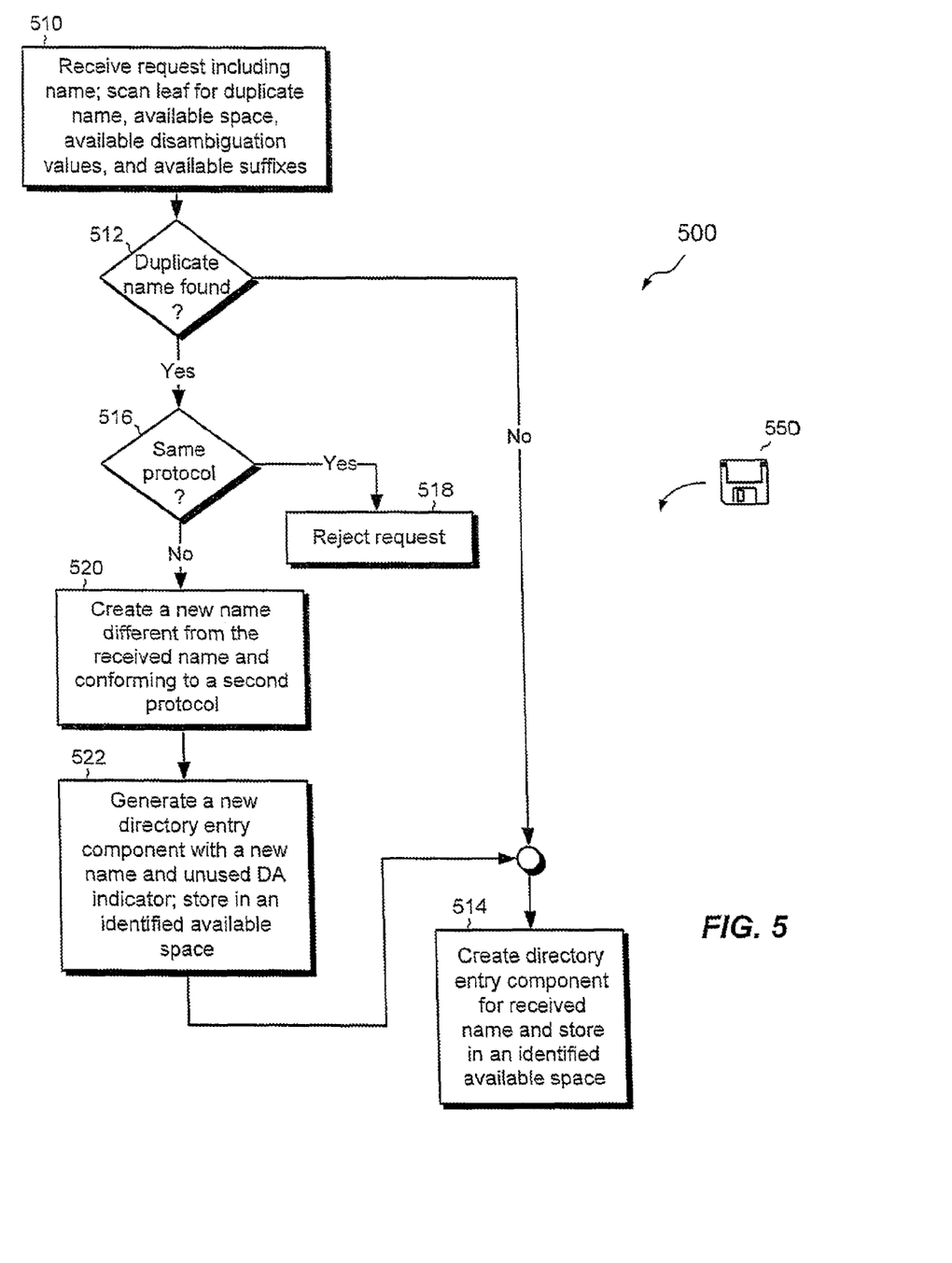
FIG. 5 is a flowchart showing an example process for storing a directory object name in a leaf of the extendible hash tree of FIG. 2.

FIGS. 4-5 illustrate processes that may be carried out in connection with the computerized apparatus 120. These processes are typically performed by the directory agent 152, described in connection with FIG. 1, which resides in the memory 150 of the computerized apparatus 120 and is run by the set of processors 140. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 4 shows an example process 400 for managing directory objects accessible using multiple network protocols. At step 410, a request is received to store a directory object having an inode number and a name, where the name conforms to a first protocol. For example, the directory agent 152 receives one of the requests 112a, 112b, or 112c from a respective client device 110a, 110b, or 110c. The request is received in accordance with a particular network protocol having a particular naming convention. The naming convention may be Unix, M256, or M83, for example.

At step 412, a hash function is executed in an input based on the received name, to generate a hash value. In an example, the received name is received in accordance with the Unix protocol. The directory agent 152 converts the received name to Unicode. If the received name is also a valid M256 name, the received name is rendered case-insensitively, e.g., by converting all characters to upper-case. If the received name is not a valid M256 name, the received name is not rendered case-insensitively. The resulting text is then subjected to an integer hash function to produce a hash value.

At step 414, a directory entry component is generated that includes the received name, the inode number, the computed hash value, and an indication of each of multiple protocols with which the directory object is accessible using the received name. For example, the directory agent 152 generates a directory entry component 310, and provides the received name, inode number, and hash value respectively for the regions 320, 322, and 324. The indication of each of multiple protocols with which the directory object is accessible using the received name is stored in the protocol flags 332. For example, the flag P1 can be set if the name 320 is accessible with Unix, the flag P2 can be set if the name 320 is accessible with M256, and the flag P3 can be set if the name 320 is accessible with M83.

At step 416, the generated directory entry component is stored in a leaf of an extendible hash tree. The extendible hash tree includes multiple leaves, and each of the leaves storing directory entry components over a predetermined range of hash values. For example, the created directory entry component 310 is stored in a leaf of the extendible hash tree 154. The leaf is addressed by a range of hash values that include the calculated hash value for the received name, in the manner described in connection with FIG. 2.

FIG. 5 shows an example process 500 for creating directory entry components in a leaf of an extendible hash tree. In an example, the process 500 is conducted each time a new request 112a, 112b, or 112c for storing a directory object is received from a client device 110a, 110b, or 110c. This example addresses the case where a received name has no illegal characters in other protocols, such that the same core portion may be used for each protocol.

At step 510, a request is received, which includes a directory object name. A leaf is identified for storing a directory entry component for the name. The identified leaf is scanned for a duplicate name and to identify any available space, available disambiguation indicator values, and available suffixes. For example, the directory agent 142 receives a request 112a, 112b, or 112c from a client device 110a, 110b, or 110c, respectively. The directory agent 142 executes a hash function based on the received name to produce a hash value 240, which points to a particular leaf (e.g., 300) of the extendible hash tree 154. The identified leaf is scanned for any duplicates of the received name, for any available spaces (e.g., 312(1) and 312(2)), and for any available DA Indicator values 328 associated with the computed hash value.

At step 512, it is determined whether any duplicate names are found. For example, the directory agent 152 checks each name 320 of each directory entry component 310 in the identified leaf to determine whether it matches the received name.

If no match is found, control proceeds to step 514, whereupon a directory entry component is created for the received name and stored in one of the identified available spaces.

However, if a duplicate name is found in the leaf, control proceeds to step 516, where it is determined whether the duplicate name was received or created for the same protocol as the received name. For example, if the request received at step 510 was in Unix, step 516 checks whether the duplicate name was received in or created for Unix. To perform this check, the directory agent 142 reads the primary protocol 330 of the directory entry component storing the duplicate name. If the primary protocol 330 indicates the same protocol as the received name (e.g., if the primary protocol 330 is UNIX_PRIMARY and the received name arrives in Unix), then the request of step 510 is rejected (step 518), as no two directory objects can have the same name in the same protocol. However, if the protocols differ (e.g., if the primary protocol 330 is M256 and the received name arrives in Unix), then there is no direct conflict, and control proceeds to step 520.

At step 520, a new name is created. The new name conforms to a second protocol (e.g., M256) and is based on but different from the received name. The new name must also be different from any other names stored in the leaf (i.e., it must be unique in the second protocol). In some examples, the new name is created by using the name received at step 510 as a core portion and adding a suffix portion, such as "~1" to the end of the core portion. For example, if the received name in UNIX is "Foo" and the names "FOO" and "FOO~1" already exist in M256 space, a new name, "FOO~2" may be created as a unique name for M256. As the initial scan identifies all the suffixes, no iterative checking or rescanning is required; the directory agent 152 simply picks the next available suffix. As "Foo," "FOO," "FOO~1," and "FOO~2" all hash to the same value, directory entry components for all of these names will be stored in the same leaf of the extendible hash tree 154. A new directory entry component 310 is generated for the newly created name. As the new directory entry component shares the same hash value with at least one other component, an available DA Indicator 328 (identified at step 510) is chosen for the new directory entry component. Protocol flags 332 are set, as needed, to identify each protocol with which the new name is accessible. A primary protocol 330 is provided to indicate the protocol for which the new name was created (e.g., M256 in this example). The new directory entry component is stored in one of the available spaces identified at step 510.

At step 514, a directory entry component is created for the received name (e.g., the received Unix name), and is stored in another of the available spaces identified at step 510. A sibling reference 334 is added to the directory entry component created at this step to point to the component created at step 522. Also, a sibling reference 334 is added for the component created at step 522 to point to the component created at step 514. The primary protocol 330 and protocol flags 332 are set appropriately.

Thus, as indicated in the process 500, multiple directory entry components are created and stored for representing a directory object in different protocols. This operation is efficiently achieved by making only a single scan of a single leaf of the extendible hash tree 154.

It is understood that other processes may be conducted in connection with the extendible hash tree 154. For example, one can look-up, list, or delete items. To look-up a directory object having a name, the name is hashed in the manner described above to generate a hash value, and the hash value is used to identify a particular leaf of the extended hash tree 154. The identified leaf is scanned, with the name 320 stored with each directory entry component string-compared with the name provided for the look-up. A directory entry component having a matching name is found. Information about the named object (e.g., information accessible from an inode table via the object's inode number 322) is then returned.

To list the contents of a directory, the directory agent 142 iterates through all reference hash values of the extendible hash tree 154 and creates a table of all identified directory objects.

To delete a named directory object, the name is hashed to identify a leaf where the name stored, the leaf is scanned for a directory entry component having the identified name, and the directory entry component is deleted (e.g., erased or deactivated). If the directory entry component includes a sibling reference 334, the sibling reference 334 is followed, and directory entry components for all siblings are also deleted.

An improved technique has been described for managing directory objects accessible via multiple protocols. The technique includes storing directory entry components in leaves of an extendible hash tree 154. Each directory entry component includes an indication of each protocol to which the name conforms, thereby allowing the same directory entry component to be used for representing directory object names in multiple protocols. The improved technique increases efficiency by keeping related information together, either in the same directory entry component (e.g., though the use of protocol flags 332 and case-insensitive hashing) or in the same leaf of the extendible hash tree 154 (e.g., by generating names for duplicates in secondary protocols using original names as cores). In addition, the improved technique is amendable to efficient memory utilization. As the extendible hash trees 154 are preferably stored in non-volatile memory (e.g., on disk), they can be accessed and operated on in small pieces, thus keeping memory resources substantially free. This feature of the extendible hash trees 154 is particularly beneficial when dealing with very large directories.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, the improvements hereof have been described with reference to three particular protocols, Unix, M256, and M83. However, these are merely examples. The principles disclosed herein may apply to protocols different from the particular ones described. The may also be applied to a greater or lesser number of protocols. Although certain protocol-specific examples are given, these relate to particular implementations and are merely illustrative.

Also, it has been described that the extendible hash trees 154 are preferably stored on disk. However, the "disk" may be physical or virtual. Indeed, the technique described herein is amenable to implementation on virtual machines as well as physical machines, and may be used in a variety of computing environments, including, for example, cloud computing environments.

Further, although features are shown and described with reference to particular embodiments hereof, such features may be included in any of the disclosed embodiments and their variants. Thus, it is understood that features disclosed in connection with any embodiment hereof can be included as variants of any other embodiment hereof, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), and the like (shown by way of example as media 450 and 550 in FIGS. 4 and 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method conducted by a set of processors for managing directory objects accessible over a network using multiple protocols, comprising:
   receiving, over the network, a request to store in memory a directory object having an inode number and a name, the name conforming to a first protocol;
   executing a hash function on an input based on the received name, to generate a hash value;
   generating a directory entry component that includes the received name, the inode number, the computed hash value, and an indication of each of multiple protocols with which the directory object is accessible using the received name; and
   storing the generated directory entry component in a leaf of an extendible hash tree, the extendible hash tree including multiple leaves, each of the leaves storing directory entry components over a predetermined range of hash values.

2. The method of claim 1, wherein generating the directory entry component includes setting at least one of multiple flags, each of the flags identifying a different one of the protocols, and wherein setting any of the flags indicates that the received name is a valid name in the protocol represented by the respective flag.

3. The method of claim 1, wherein the method further comprises, prior to storing the generated directory entry component, scanning the leaf to determine whether the received name is already stored within the leaf.

4. The method of claim 3, wherein scanning the leaf includes identifying any available spaces for storing directory entry components in the leaf, and wherein the method further comprises:
   detecting, in response to scanning, that the received name is already present in the leaf in a directory entry component that indicates that the received name is accessible using a second protocol;
   creating a secondary name, different from the received name and conforming to the second protocol;
   generating a second directory entry component that includes the secondary name; and
   storing the secondary directory entry component in the leaf,
   wherein, when storing the generated directory entry component in connection with the received name, the directory entry component is stored in one of the identified available spaces.

5. The method of claim 4, wherein the secondary name includes a core portion and a suffix portion, wherein executing the hash function based on the core portion produces the same hash value as executing the hash function based on the received name.

6. The method of claim 5, further comprising, in response to scanning identifying no available space in the leaf:
   chaining additional storage to the leaf;
   storing a pointer in the leaf that points to the additional storage.

7. The method of claim 3, wherein executing the hash function includes rendering the received name in the first protocol case-insensitively prior to hashing.

8. The method of claim 3, further comprising:
   receiving a second request to store a directory object having a second name, the second name conforming to the first protocol;
   executing the hash function on an input based on the second name, to generate a second hash value, wherein the second hash value is equal to the hash value, thereby resulting in a hash collision;
   generating a second directory entry component that includes the second name, the second hash value, and a disambiguating indicator to distinguish the second directory entry component from the directory entry component stored in connection with the first name; and
   storing the second directory entry component in same leaf with the directory entry component stored in connection with the first name.

9. The method of claim 8, wherein the disambiguating identifier is different for each new directory entry component stored in connection with the same computed hash value.

10. The method of claim 1, wherein the received name is an illegal name in a second protocol of the multiple protocols, and wherein the method further comprises:
   generating a second name for the second protocol that replaces any illegal characters in the received name with legal characters for the second protocol;
   executing the hash function on an input based on the second name, to generate a second hash value; and
   generating a second directory entry component that includes the second name, the second hash value, and the hash value based on the received name as a sibling reference, wherein storing the generated directory entry component for the received name includes storing the second hash value as a sibling reference.

11. The method of claim 1, wherein the received name is an illegal name in a second protocol of the multiple protocols, wherein the received name is an illegal name in a third protocol of the multiple protocols, and wherein the method further comprises:
generating a second name for the second protocol that includes only legal characters for the second protocol;
generating a third name for the third protocol that includes only legal characters for the third protocol;
executing the hash function on an input based on the second name, to generate a second hash value;
executing the hash function on an input based on the third name, to generate a third hash value;
generating a second directory entry component that includes the second name, the second hash value, and the third hash value as a sibling reference;
generating a third directory entry component that includes the third name, the third hash value, and the hash value based on the received name as a sibling reference; and
providing the directory entry component for the received name with the second hash value as a sibling reference.

12. The method of claim 1, wherein, when storing the generated directory entry component, the directory entry component is stored to disk.

13. The method of claim 1, further comprising, in response to a near-full leaf of the extendible hash tree not having enough free space to accommodate an additional directory entry component, converting the near-full leaf into an index; creating a new pair of leaves, and distributing the directory entry components of the near-full leaf among the new pair of leaves.

14. The method of claim 1, further comprising adding an additional leaf to the extendible hash tree only when a leaf to which a computed hash code for a directory entry component is mapped does not have room to store the directory entry component.

15. A computerized apparatus for managing directory objects accessible using multiple protocols, comprising:
a network interface;
a set of processors, coupled to the network interface; and
memory, coupled to the set of processors, the memory constructed and arranged to store instructions executable by the set of processors,
wherein the set of processors executing instructions from the memory forms a specialized circuit constructed and arranged to:
receive, over the network, a request to store in memory a directory object having an inode number and a name, the name conforming to a first protocol;
execute a hash function on an input based on the received name, to generate a hash value;
generate a directory entry component that includes the received name, the inode number, the computed hash value, and an indication of each of multiple protocols with which the directory object is accessible using the received name; and
store the generated directory entry component in a leaf of an extendible hash tree, the extendible hash tree including multiple leaves, each of the leaves storing directory entry components over a predetermined range of hash values.

16. The computerized apparatus of claim 15, wherein the specialized circuit is further constructed and arranged, prior to storing the generated directory entry component, to scan the leaf to determine whether the received name is already stored within the leaf.

17. The computerized apparatus of claim 16, wherein, when constructed and arranged to scan the leaf, the specialized circuit is further constructed and arranged to identify any available spaces for storing directory entry components in the leaf, and wherein the specialized circuit is further constructed and arranged to:
detect, in response to scanning, that the received name is already present in the leaf in a directory entry component that indicates that the received name is accessible using a second protocol;
create a secondary name, different from the received name and conforming to the second protocol;
generate a second directory entry component that includes the secondary name; and
store the secondary directory entry component in the leaf, wherein the directory entry component is stored in one of the identified available spaces.

18. A non-transitory computer readable medium including instructions which, when executed by a set of processors, cause the set of processors to perform a method for managing directory objects accessible over a network using multiple protocols, the method comprising:
receiving, over the network, a request to store in memory a directory object having an inode number and a name, the name conforming to a first protocol;
executing a hash function on an input based on the received name, to generate a hash value;
generating a directory entry component that includes the received name, the inode number, the computed hash value, and an indication of each of multiple protocols with which the directory object is accessible using the received name; and
storing the generated directory entry component in a leaf of an extendible hash tree, the extendible hash tree including multiple leaves, each of the leaves storing directory entry components over a predetermined range of hash values.

19. The non-transitory computer readable medium of claim 18, wherein the method further comprises:
receiving a second request to store a directory object having a second name, the second name conforming to the first protocol;
executing the hash function on an input based on the second name, to generate a second hash value, wherein the second hash value is equal to the hash value, thereby resulting in a hash collision;
generating a second directory entry component that includes the second name, the second hash value, and a disambiguating indicator to distinguish the second directory entry component from the directory entry component stored in connection with the first name; and
storing the second directory entry component in same leaf with the directory entry component stored in connection with the first name.

20. The non-transitory computer readable medium of claim 19, wherein the disambiguating identifier is different for each new directory entry component stored in connection with the same computed hash value.

* * * * *